US009059587B2

(12) United States Patent
Williams (10) Patent No.: US 9,059,587 B2
(45) Date of Patent: Jun. 16, 2015

(54) SYSTEM AND METHOD OF SUPPLYING POWER TO LOADS OF A DRILLING RIG

(76) Inventor: Kevin R. Williams, Cypress, TX (US)

(*) Notice: Subject to any disclaimer, the term of this patent is extended or adjusted under 35 U.S.C. 154(b) by 699 days.

(21) Appl. No.: 13/419,125

(22) Filed: Mar. 13, 2012

(65) Prior Publication Data
US 2012/0223524 A1 Sep. 6, 2012

Related U.S. Application Data (63) Continuation-in-part of application No. 12/757,234, filed on Apr. 9, 2010, now Pat. No. 8,446,037.

(60) Provisional application No. 61/266,734, filed on Dec. 4, 2009.

(51) Int. Cl.
| | |
|---|---|
| H02J 3/38 | (2006.01) |
| H02J 5/00 | (2006.01) |
| H02K 7/18 | (2006.01) |
| H02J 3/00 | (2006.01) |

(52) U.S. Cl.
CPC ..... *H02J 5/00* (2013.01); *H02J 3/38* (2013.01); *H02K 7/18* (2013.01); *H02J 3/005* (2013.01)

(58) Field of Classification Search
CPC ................ H02K 7/18; H02J 3/38; H02J 5/00
USPC .................................................. 307/23, 25, 26
See application file for complete search history.

(56) References Cited

U.S. PATENT DOCUMENTS

| | | | |
|---|---|---|---|
| 4,590,416 A | 5/1986 | Porche et al. | |
| 7,748,450 B2* | 7/2010 | Mundell | 166/250.15 |
| 2008/0203734 A1 | 8/2008 | Grimes et al. | |
| 2009/0195074 A1 | 8/2009 | Buiel | |
| 2009/0312885 A1 | 12/2009 | Buiel | |
| 2011/0074165 A1 | 3/2011 | Grimes et al. | |

* cited by examiner

*Primary Examiner* — Hal Kaplan
(74) *Attorney, Agent, or Firm* — Egbert Law Offices, PLLC (57) ABSTRACT

A system for providing power to a load of a drilling rig has a natural gas engine/generator and an energy storage system. The load is switchably connected to one or both of the natural engine/generator and the energy storage system. The natural gas engine/generator and the energy storage system have a capacity suitable for supplying requisite power to the load. A rectifier is connected to an output line of the engine/generator so as to convert the AC power to DC power. This rectifier is a phase-controlled silicon-controlled rectifier so as to be responsive to a power requirement of the load. The energy storage system is a battery.

15 Claims, 7 Drawing Sheets

SYSTEM AND METHOD OF SUPPLYING POWER TO LOADS OF A DRILLING RIG

CROSS-REFERENCE TO RELATED APPLICATIONS

The present application continuation-in-part of U.S. patent application Ser. No. 12/757,234, filed on Apr. 9, 2010, and entitled "Energy Storage System for Peak-Shaving of Drilling Rig Power Usage", presently pending. U.S. patent application Ser. No. 12/757,234 claimed priority from U.S. Provisional Patent Application No. 61/266,734, filed on Dec. 4, 2009.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to energy systems as used on drilling rigs. More particularly, the present invention the relates to drilling rigs that are supplied with power from a natural gas engine/generator. Additionally, the present invention relates systems for supplying power and for storing power through the use of batteries.

2. Description of Related Art Including Information Disclosed Under 37 CFR 1.97 and 37 CFR 1.98.

In the field of oil well drilling, significant amount of power is required during the drilling activity. The power requirements, as used on a drilling rig, serve to supply the drawworks, the mud pumps, the top drives, the rotary tables, the dynamic braking systems and other peripheral loads. In oil well drilling activities, oversized power systems are often utilized so as to meet the "peak" power requirements.

Historically, the number of engines/generators that are used and are typically online are more than the required load of the application due to the redundancy and necessary peak KW and VAR demand during certain aspects of the operation. In particular, these peak demands are during the "tripping" of the pipe or drill stem.

During normal operations, there is a base load of lighting, pumps, agitators, mixers, air compressors, etc. This base load can make up typical loads of 400-600 kilowatts. The mud pumps, top drives and rotary tables contribute another fairly consistent KW demand. This demand will vary based on the particular well, depth of drilling, and material being drilled.

During oil well drilling activities, the most intermittent load is the drawworks. This intermittent load is directed toward the peak demand during the raising or lowering of the drill pipe upwardly and downwardly in the well. This peak demand can have loads as much as two to three times the base loads of the other demands on the drilling rig.

When drilling and at times when the downhole tool has to be inspected or changed, it is required to pull all of the drill pipe from the hole. This distance can be 10,000 feet or more. The drill pipe must be taken apart and stacked as it is being removed. After repair or replacement, the reverse procedure must take place so as to reinsert all the components back to the desired depth. During the tripping in or out of the hole, the driller (operator) demands extreme power consumption and very quick bursts as the driller raises (or lowers) the string of drill pipe. Since there is a limitation on the height of the drilling mast, the operator must lift the sections in increments and unscrew the different sections. These sections are stacked one at a time. This process is repeated during the reinsertion of the drill pipe back into the hole. This process is referred to as "making a trip". The intermittent high demand occurs when this load (300,000 pounds or more) occurs over and over again. The load is inconsistent since the weight of the drill stem becomes less and less as sections are removed. The base load requirements for the drilling rig are approximately 600 to 800 KW. The peak demand can be 1.5 MW and as high as 2.0 MW. Because of these power requirements, the emissions of the engines/generators for a typical land rig are quite high. Newer engines can have much lower NOx output than earlier engines. There are also large amounts of carbon dioxide emissions. The fuel consumption during these intermittent demands can be quite significant.

Natural gas generators are being used for land-based drilling application and offer unique advantages in reduced exhaust emissions and fuel cost savings compared to more commonly used diesel engine/generators. Natural gas engine/generators make it much simpler to meet ever more stringent emissions regulations, particularly for oxides of nitrogen (NOx). Fuel cost on a consumed energy basis is significantly when compared to diesel engine generators. Additionally, natural gas engine/generators have the added advantage of accepting wellhead gas for further cost benefits.

For the typical drilling rig operations, power is derived from the contractor's onsite generators with the prime movers being either diesel engines or spark-ignited engines fueled by natural gas, or compression-ignited engines using a combination of diesel and natural gas fuels (referred to as dual fuel generators). Diesel engines have much better load characteristics compared to natural gas engines and therefore respond more reliably to changes in loads as drilling functions abruptly demand power requirements, such as tripping of the drill string.

When natural gas engine/generators utilize wellhead gas, this eliminates the need for the delivery of natural gas by trucks or by rail. It also minimizes the need to vent or flare the gas. Unfortunately, the wellhead natural gas is a variable supply. The content of the natural gas produced at the wellhead can have various components. As such, this natural gas will need to be scrubbed prior to being used by the natural gas engine/generator. As a result, the supply of wellhead gas can be of a variable supply and a variable energy content.

Dual fuel generators offer some reduced fuel costs, but this is limited since the generator must switch from high volume ratios of natural gas back to high volume ratios of diesel in order to meet the block loading and load shedding conditions forced by changing rig power demands. A gas engine generator fueled entirely by compressed natural gas, pipeline gas, or LNG, would eliminate the use of diesel. This enables gas engine generators to provide improved fuel cost savings and reduced emissions when compared to dual fuel generators.

Figure 1:
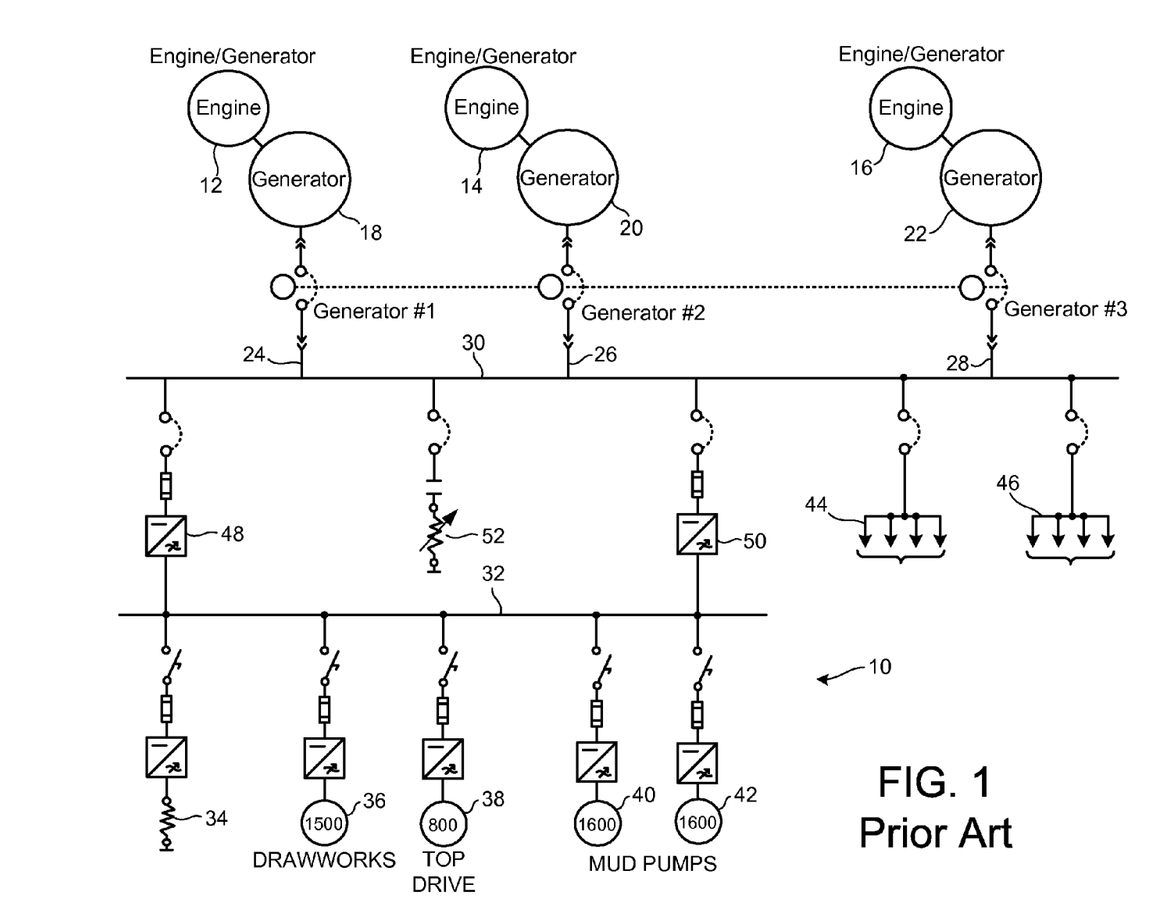
FIG. 1 is a schematic diagram of a prior art power system for the loads of a drilling rig.

Referring to FIG. 1, there is shown a prior energy system for use with the various loads of a drilling rig. In particular, the energy system 10 includes engines 12, 14 and 16. Engine 12 operates generator 18. Engine 14 operates generator 20. Engine 16 operates generator 22. The generators 18, 20 and 22 will pass AC power along respective lines 24, 26 and 28 to a common AC bus 30. Typically, the various engine/generators, as shown in FIG. 1, are diesel engines. However, it is possible that such engine/generator combination could be also natural gas engine/generators.

A common DC bus 32 is illustrated as connected to the various components 34, 36, 38, 40 and 42 of the drilling rig. Load 34 is a DB module. Load 36 is the drawworks. Load 38 is the top drive. Loads 40 and 42 are the mud pumps. Each of these loads 34, 36, 38, 40 and 42 are switchably connected to the common DC bus 32.

The AC bus is configured to supply power to the hotel loads 44 and 46 of the drilling rig. Hotel loads 44 and 46 can include air conditioning and heating, lighting, and other energy requirements of the drilling rig.

A first rectifier 48 is connected between the AC bus 30 and the DC bus 32. Rectifier 38 serves to convert the AC power to DC power. Similarly, the other rectifier 50 is connected between the AC bus 30 and the DC bus 32, also to convert the AC power to DC power. The DC power is properly utilized by the loads 34, 36, 38, 40 and 42.

In FIG. 1, it can be seen that there is a resistive load bank 52 that is connected, by a switch, to the AC bus. As such, any excess energy that is provided by the various engine/generator combinations can be burned as heat by the resistive load bank 52.

Currently-used gas engine/generators that are used to power a drilling rig must be controlled to accept a lower level of transient response than is possible with diesel power. This requires the estimating of the transient response capability of the gas engine/generator and the determining of how the rate of application or rate of load removal can be reduced to make the system work. Unfortunately, this results in reduced power rates and decreased rig productivity, even with the use of a ballast load or resistive load bank 52. A typical approach is to create a load profile of the rig's expected operations in terms of power required versus time. The creation of this profile for both the desired "ideal" loading rates and for the drill site's minimum requirements will establish the minimum and maximum loading conditions for the rig powerhouse. Gas engine/generator operation is then controlled within these minimum and maximum values to attempt to minimize power interruptions from forced generator failure.

Figure 2:
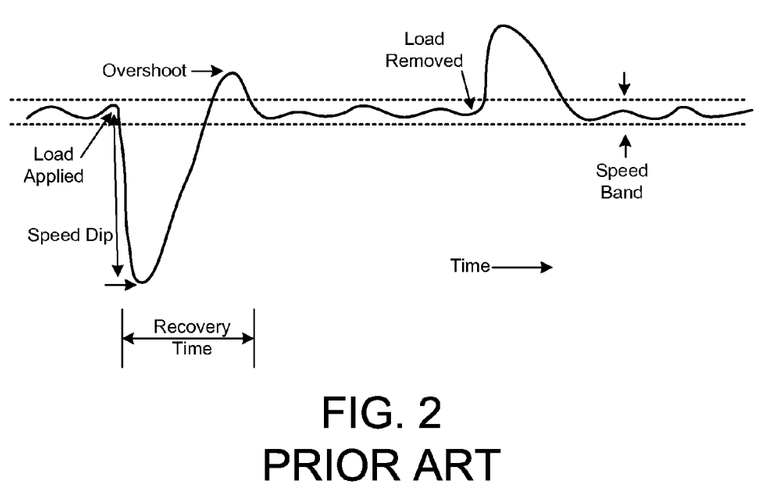
FIG. 2 is a graph showing the transient response of a natural gas engine/generator as measured by a percentage frequency change and duration.

FIG. 2 shows the transient response of the natural gas engine/generator during the adding of load of the shedding of load. All gensets to either have a response to such added load or shredded load. Changes in voltage and frequency associated with this transient response is dependent on the generator type (e.g., diesel compression versus natural gas spark-ignited engine) and the magnitude of the load change, where these step loads are described as some percentage of full rated power.

The transient response and steady state stability of generator set engines can vary because of a number of factors, such as engine model, engine speed, aspiration, power factor, governor and the presence of an idle circuit. Diesel engines have a short mechanical path between the governor actuator and the fuel delivery system to the combustion chamber. This system responds quickly and in a more stable manner to load change requests from the governor. Whenever a large load is added to a generator set, engine speed temporarily slows down, or dips, before returning to its steady-state condition. When a load is removed, engine speed increases, or overshoots, temporarily. Since generator frequency is determined by engine RPM, the quality of electrical power is impacted. The measurements of these temporary speed changes is referred to as "transient response".

Figure 3:
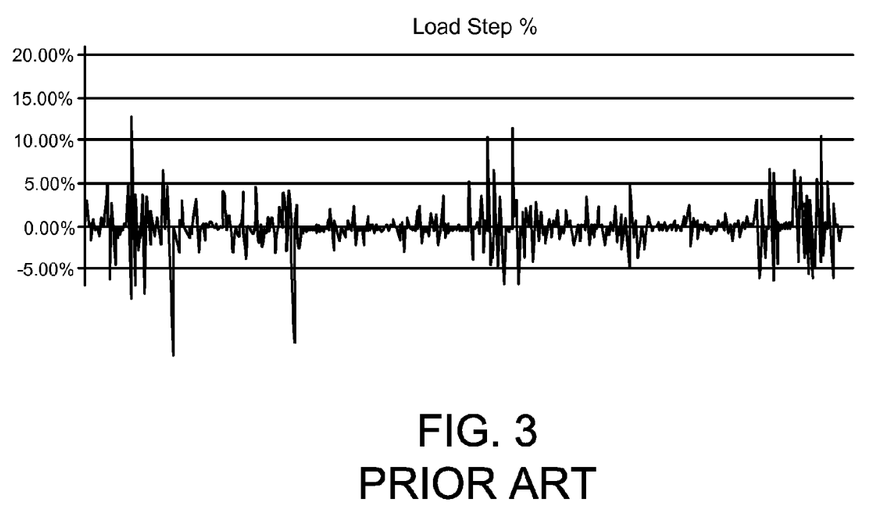
FIG. 3 is a graph showing a typical rig power demand during tripping operations.

The transient response is measured by percentage frequency change and duration. This relationship is illustrated in FIG. 3 herein. The amount of time it takes for the engine to return to steady-state operation is referred to as "recovery time". This can vary from as little as one second to twenty seconds. In general, the greater the load added to the bus, the greater the percentage of dip and the longer it will take the engine to recover. Dips are generally more critical than overshoots because severe block loading can stall the engine and cause generator voltage to collapse.

There no formal documentation of a transient performance of the natural gas engine/generator beyond a nominal 10% to 15% (step load) of rated load. Generally, such natural gas engine/generators have a step capability of 50% of rated power. Certain added systems, such as transient richening and turbocharger bypass, enables the natural gas engine/generators to accept 10% transient load step and to reject transient load steps up to 25% of rated power from any given load point.

FIG. 3 is a typical step loading profile (i.e., step load increase or decrease as a percentage of rated kW per time increment) from the measured rig data during pipe tripping operations. Positive percentage is added rig power from one generator and negative percentage is load shedding. This is normalized to a rated power of 1350 kW, at sea level. This data shows a properly set generator control uniquely tuned to avoid large load changes which could lead to an interruption in generator operation and power loss. While these data is typical of tripping events, for drilling, higher transient peaks (especially load shedding of 25% or more) have been noted but with lower average load changes.

Figure 4:
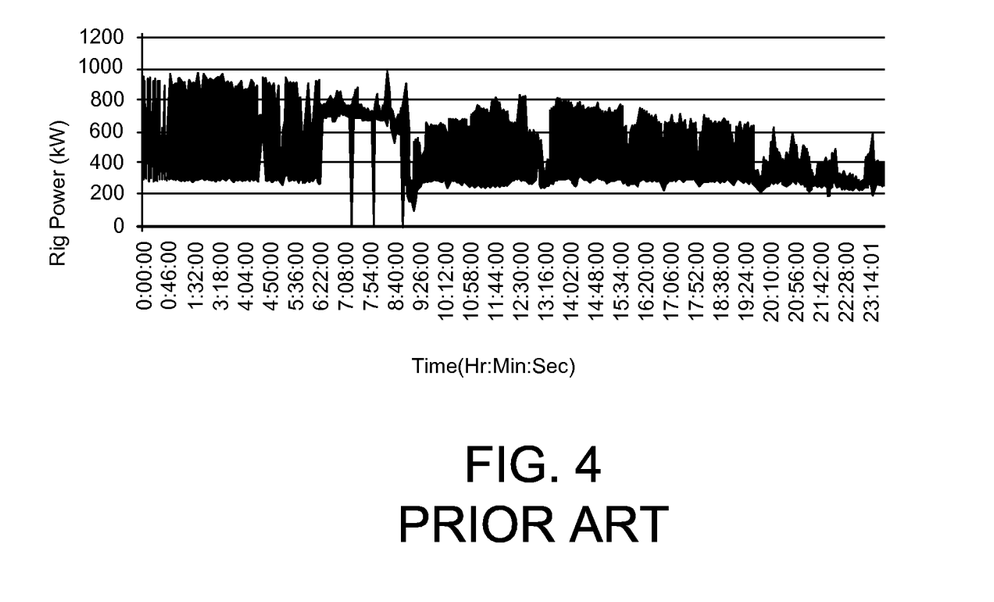
FIG. 4 is a graph showing cyclical power profiles from tripping and drilling operations.
Figure 5:
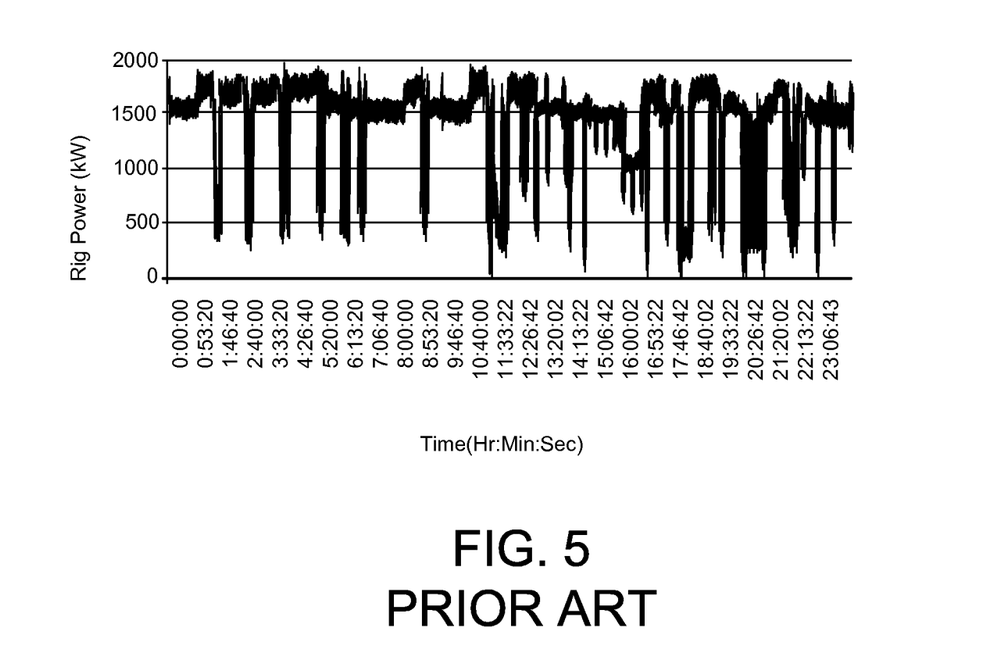
FIG. 5 shows power demand during drilling operations over a twenty-four hour period.

FIG. 4 illustrated the typical rig power demand during tripping operations. In particular, FIG. 4 shows the actual gas drilling rig data and data plots highlighting these rig power demands. This plot shows twenty-four hours of data and shows typical cyclical power profiles for tripping and drilling operations. FIG. 5 shows the typical power demand during drilling operations over a twenty-four hour period.

In the past, various patents and patent publications have been issued that relate to power usage and the control of such power usage by drilling rig systems. For example, U.S. Pat. No. 4,590,416, issued on May 20, 1986, to Porche et al., teaches a closed loop power factor control for power supply systems. This power factor controller for alternating current/direct current drilling rigs. The power factor controller utilizes a uniquely controlled, unloaded, over-excited generator to reactive power to maintain the rig's power factor within prescribed limits during peak demand operations. In particular, this method includes the step of: (1) sensing the instantaneous system power factors; (2) comparing the sensed instantaneous power factor to a prescribed power factor; (3) forming a power factor control signal indicative of the difference between the sensed power factor and the prescribed power factor; (4) providing a field excitation signal to an unloaded over-excited generator operated in the motor mode in proportion to the power factor control signal so as to cause the over-excited generator to generate the requisite reactive power to correct the system's power factor to the prescribed power factor; and (5) coupling the output of the over-excited generator to the power system.

U.S. Patent Publication No. 20088/0203734, published on Aug. 28, 2008 to Grimes et al., describes a wellbore rig generator engine power control system. This system controls power load to a rig engine. This system includes a sensor for controlling a rig engine and a sensor for sensing the exhaust temperature of a rig engine. The sensor is in communication with the controller so as so as to provide the controller with signals indicative of the exhaust temperature. The controller maintains power load to the rig engine based on the exhaust temperature.

U.S. Patent Publication No. 2009/0195074, published on Aug. 6, 2009 to Buiel, shows an energy supply and storage system for use in combination with a rig power supply system. This system includes a generator start/stop and a power output control. A bi-directional AC/DC converter converts the AC power generated by the engine-generator. The power supply is adapted to draw energy from the storage system when the rig motor exceeds the capacity of the generator.

U.S. Patent Publication No. 2009/0312885, published on Dec. 17, 2009 to Buiel, teaches a management system for drilling rig power supply and storage. This management system has a power generator coupled to rig loads. The power generator is used for powering and charging the storage system. The energy storage system draws energy from the storage system in periods of high power requirements and distributes excess energy to the storage system in periods of lower power requirements. The output of the power generator is managed based on the rig power usage wherein the output is increased when the rig power requirements are above a preselected threshold and wherein the output is decreased when the rig power requirements fall below a preselected threshold.

U.S. Patent Publication No. 2011/0074165, published on Mar. 31, 2011 to Grimes et al., describes a system for controlling power load to a rig engine of a wellbore rig. The system includes a controller for controlling the rig engine and a sensor for sensing the exhaust temperature of the rig engine. The sensor is in communication with the controller for providing to the controller signals indicative of the exhaust temperature. The controller maintains the power load to the rig engine based on the exhaust temperature.

U.S. Pat. No. 7,311,248, issued on Dec. 15, 2009 to the present inventor, provides a system for managing energy consumption in a heave-compensating drawworks. This system includes a power supply, a winch drum connected to the power supply so as to receive power from the power supply, a flywheel connected to the winch drum and to the power supply, and a controller connected to the power supply and to the winch drum for passing energy to and from the flywheel during an operation of the winch drum. The flywheel includes a disk rotatably coupled to an AC motor. This power supply includes a first pair of AC motors operatively connected on one side of the winch drum and a second pair of AC motors operatively connected on an opposite side of the winch drum.

It is an object of the present invention to provide an energy storage system for use on a drilling rig which allows natural gas engine/generator to operate with the same reliability and responsiveness as that of a diesel engine/generator.

It is another object of the present invention to provide an energy storage system which improves rig efficiency through energy recovery.

It is another object of the present invention to provide an energy storage system which serves to reduce the amount of wasted fuel that had previously been lost in resistive load banks.

It is another object of the present invention to provide an energy storage system which can reduce natural gas fuel consumption and reduce emissions.

It is a further object of the present invention to provide an energy storage system which allows operators to utilize wellhead gas as the fuel for the generator system.

It is still another object of the present invention to provide an energy storage system which serves as an uninterruptible power supply for use during fuel interruptions.

It is still a further object of the present invention to provide an energy storage system which reduces the vulnerability of the generator's output to variations in wellhead gas flow rates and methane contents.

These and other objects and advantages of the present invention will become apparent from a reading of the attached specification and appended claims.

BRIEF SUMMARY OF THE INVENTION

The present invention is a system for supplying power to loads of a drilling rig which comprises a natural gas engine/generator having an output line so as to supply AC power, an energy storage system, and a load switchably connected to one or both of the natural engine/generator and the energy storage system. The natural gas engine/generator and the energy storage system have a capacity suitable for supplying requisite power to the load. A natural gas supply is cooperative with a natural gas engine/generator so as to supply natural gas to the natural gas engine/generator. This natural gas supply can either be a wellhead gas or delivered gas.

A rectifying means is connected to an output line of the engine/generator. The rectifying means serves to convert the AC power to DC power. This rectifying means is a silicon-controlled rectifier. The silicon-controlled rectifier is phase-controlled so as to be responsive to a power requirement of the load. A phase microcontroller is connected to the load and to the natural gas engine/generator. The phase microcontroller is cooperative with the energy storage system so as to supply power from the energy storage system to the load.

In the preferred embodiment of the present invention, the natural gas engine/generator comprises a plurality of natural gas engine/generators that have output lines thereof connected to a common AC bus. The load comprises a plurality of loads connected by a line to a common DC bus. The energy storage system is connected to the common DC bus. The rectifying means is connected between the common AC bus and the common DC bus so as to cause the plurality of natural gas engine/generators to pass DC power to the common DC bus.

A plurality of autotransformers are respectively connected between the plurality of natural gas engine/generators and the common AC bus. The load can be at least one component of the drilling rig. In the preferred embodiment of the present invention, the energy storage system is a battery or series of batteries. However, it should be noted that, within the concept of the present invention, the energy storage system can take on a wide variety of other arrangements, such as flywheels or ultracapacitors.

A switching means is provided for switching a supply of power to the load between the natural gas engine/generator and the energy storage system based on a power output of the natural gas engine/generator and based upon the requisite power requirement by the load. The switching means serves to monitor the power output of the natural gas engine/generator.

The present invention is also a method for the supply power to a drilling rig. This method includes the steps of: (1) producing power from an natural gas engine/generator so as to produce an AC power output; (2) providing an energy storage system switchably connected to the load; and (3) switching power supplied to the load between one or both of the natural gas engine/generators and the energy storage system based upon a power requirements of the load. The AC power is rectified from the natural gas engine/generator so as to pass DC power to the load. The rectified power is switched by a phase-controlled microcontroller. The power is switched power from the natural gas engine/generator to the energy storage system when the power output of the natural gas engine/generator exceeds the power requirement of the load. A supply of natural gas from a wellhead can be delivered to the natural gas engine/generator. This wellhead can be adjacent to the engine/generators. The AC power output from the natural gas engine/generator is autotransformed and rectified so as to pass DC power to the load.

When properly designed and implemented, the energy storage system of the present invention provides the operator of gas drilling rig with reliability and responsiveness similar to that of a diesel rig. Rig efficiency is improved through energy recovery and by reducing the amount of wasted fuel previously lost in a resistive load bank. In the case where auxiliary diesel gensets are provided for standby power, the incorporation of the energy storage system eliminates this need. These benefits lead to reduce natural gas fuel consumption and reduce emissions.

Natural gas engine/generators that are used in combination with energy storage can operate more reliably on wellhead gas so as to further reduce costs. This is achieved through the energy storage's ability to generate a load response and the UPS power ride-through for fuel interruptions. This reduces the vulnerability of generator output to variations in wellhead gas flow rate and methane content.

The gas engine/generator, that is fueled entirely by compressed natural gas, pipeline gas, or LNG, will eliminate the use of diesel fuel. This allows gas engine/generators to provide improved cost savings and reduced emissions compared to dual fuel generators. Because of the bi-directional electrical power provided the energy storage system, the reliability and responsiveness of the gas engine/generator meets or exceeds that of the dual fuel or diesel fuel generator.

The foregoing Summary of the Invention is intended to generally summarize the preferred embodiment of the present invention. This section is not intended, in any way, to be limiting of the scope of the present invention. The scope of the present invention should only be limited by the following claims and their legal equivalents.

DETAILED DESCRIPTION OF THE INVENTION

Figure 6:
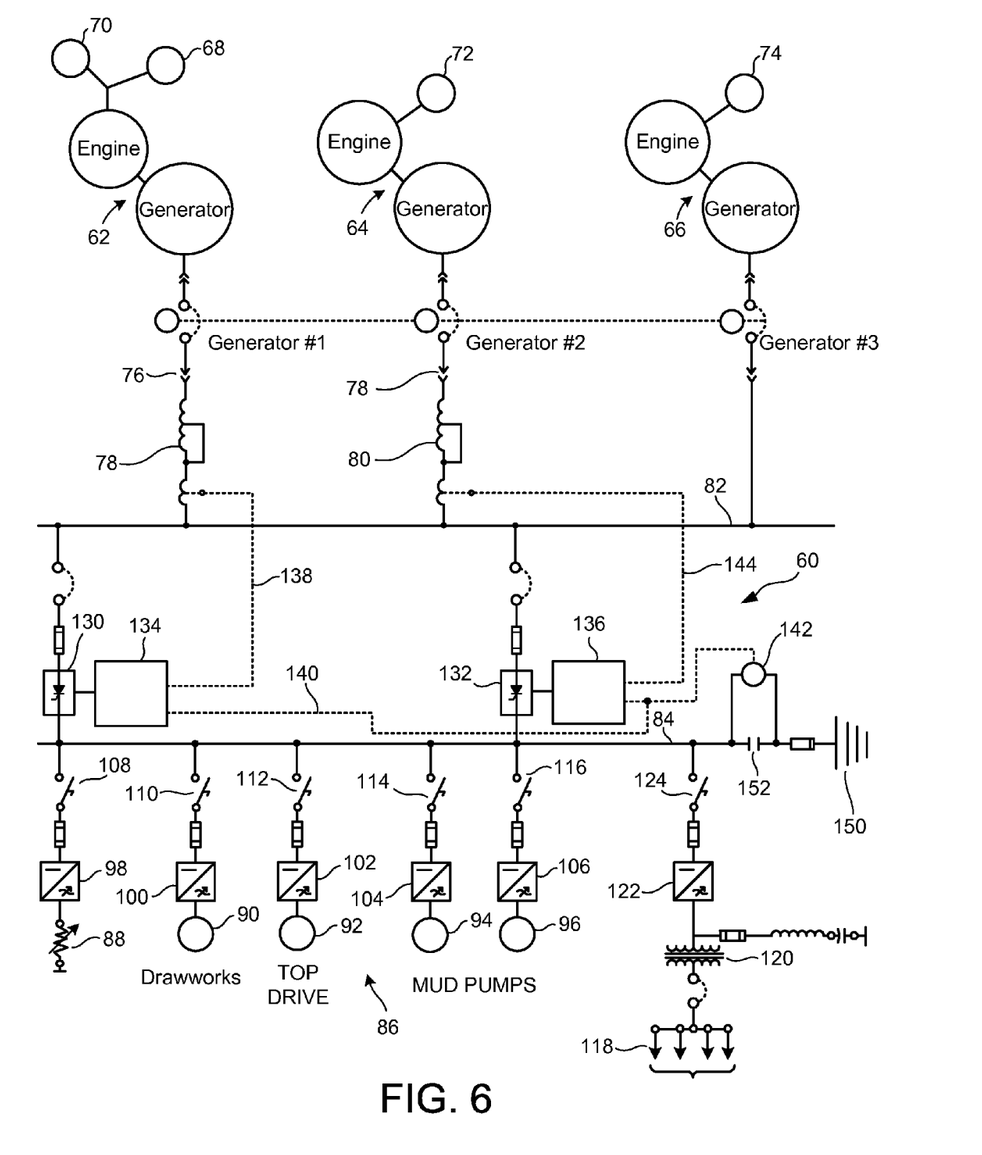
FIG. 6 is schematic diagram showing the power supply system for a drilling rig in accordance with the preferred embodiment of the present invention.

Referring to FIG. 6, there is shown the power supply system 60 in accordance with the preferred embodiment of the present invention. The power supply system 60 includes a first gas engine/generator 62, a second gas engine/generator 64, and a third gas engine/generator 66. For the purposes of illustration, it can be seen that the first gas engine/generator set 62 is supplied by the wellhead 68 and by a natural gas storage 70. The gas engine/generator set 64 is supplied by a supply 72 of natural gas, such as a tank, a container of LNG, or other delivered natural gas. The gas engine/generator set 66 is illustrated as being supplied with natural gas by a wellhead 74. The wellhead 74 is generally in proximity to the gas engine/generator set 66. As can be seen, there are a variety of techniques that are available within the power supply system 60 of the present invention so as to provide the natural gas for the powering of the engine/generators 62, 64 and 66. In particular, the present invention makes it possible to utilize the inconsistent quality and quantity of wellhead gas for the operation of the loads of the drilling operation.

The first gas engine/generator set 62 is connected by a line 76 to an autotransformer 78. The autotransformer 78 is an electrical transformer with only one winding. This winding acts as both the primary and the secondary. The winding has three taps where electrical connections are made. As such, it can be utilized so as to step-up or step-down the outputs from the inputs. The primary voltage is applied across two terminals of the autotransformer while the secondary voltage is taken from these two terminals. Since the volts-per-turn is in the same winding, each develops a voltage in proportion to the number of turns. The second engine/generator set 64 is connected along line 78 to an autotransformer 80. The third engine/generator set 66 is connected by line 80 to the main AC bus 82. Lines 76 and 78 are also connected to the AC bus 82.

A common DC bus 84 is illustrated as connected to the various loads of the drilling rig 86. In particular, these loads can include a variable DB/load bank 88, a drawworks 90, a top drive 92 and mud pumps 94 and 96. Variable frequency drives 98, 100, 102, 104 and 106 are respectively connected to the loads 88, 90, 92, 94 and 96. The variable frequency drives 98, 100, 102, 104 and 106 are systems for controlling the rotational speed of an AC motor by controlling the frequency of electrical power supplied to the motor. DC switches 108, 110, 112, 114 and 116 are respectively interposed between the common DC bus 84 and the respective loads 88, 90, 92, 94 and 96.

The hotel system 118 can also be connected to the DC bus 84. An isolation transformer 120 is provided between the variable frequency drive 122 and the hotel system 118. A switch 124 is interposed between the variable frequency drive 122 and the DC bus 84.

Importantly, in the present invention, rectifiers are provided between the AC bus 82 and the DC bus 84. A silicon-controlled rectifier (SCR) bridge 130 is positioned between the AC bus 82 and the DC bus 84. Another SCR bridge 132 is positioned between the AC bus 82 and the DC bus 84. Each of the SCR bridges 130 and 132 are solid state semiconductors which conduct when the gate receives a trigger current and continues to conduct when they are forwardly biased. In the "off state", the SCR bridge will restrict the current to a leakage current. When the gate-to-cathode voltage exceeds a certain threshold, the SCR bridge turns on and conducts current. The SCR bridges 130 and 132 will remain in an on-state as long it remains above the holding current. Once the current falls below the holding current for a period of time, the device will switch off.

A phase microcontroller 134 is connected to the SCR bridge 130. Similarly, a phase microcontroller 136 is connected to the SCR bridge 132. As such, these microcontrollers 134 and 136 will utilize the phase angle so as to regulate the power delivered to the load by way of the SCR bridges. Each SCR bridge of the back-to-back pair is turned on for a variable portion of the half-cycle that it conducts. Power is regulated by advancing or delaying the point at which the SCR bridge is turned on within each half cycle. This phase angle control provides for fine resolution of power and is utilized to control fast-responding loads, such as loads in which the resistance change is a function of temperature. Power is regulated by advancing or delaying the point at which the SCR bridges are turned on.

It can be seen that the phase microcontroller 134 is connected by line 138 to the line 76 associated with the gas engine/generator set 62. The phase microcontroller 134 is also connected by line 140 to the voltage meter 142 that is connected to the common DC bus 84. Similarly, the phase microcontroller 136 is connected by line 144 to the line 78 associated with the second gas engine/generator 64 and is also connected to the voltage meter 142.

The battery bank 150 is connected to the common DC bus 84. As such, the battery bank 150 can supply power to the loads 88, 90, 92, 94 and 96. A battery bank contactor 152 is provided so as to allow the battery bank to be connected to and disconnected from the common DC bus 84.

The overall topology of the power system 60 of the present invention ties into the existing common DC bus 84. The gas engine/generator sets 62, 64 and 66 are boosted in line voltage to 660 VAC via the autotransformers 76 and 78. The existing 600 V loads are disconnected and now derived from the continuously-rated DC-to-AC fixed voltage, fixed frequency pulse-width modulation-filtered inverters. The variable frequency drives 98, 100, 102, 104 and 106 are supplied from the cumulative energy from the gas engine/generator sets 62, 64 and 66 and the DC bus-connected energy storage system 150. The system control and monitoring is PLC-based with Ethernet IP network communications input/output energy storage controllers, variable frequency drives and existing rig control systems. The detailed monitoring of system activity is displayed an HMI located on the local control panel cubical door. A summary HMI monitoring screen is provided with remote viewing by the driller and/or tool pusher. All activity of the energy storage system is logged, time-stamped, and permanently recorded for later analysis. Within this system topology, the variable frequency drive systems, along with all peripheral 600 V loads, are supplied from the cumulative and power management-selected energy sources, such as the DC energy storage system and the gas engine/generator sets 62, 64 and 66. By phase microcontrolling the AC-to-DC rectifiers, the power management system disconnects between amounts of energy contributed from the energy sources.

The energy storage system 150 is continually cycling between delivering power to help the gas engine/generator sets 62, 64 and 66 meet rig demand and absorbing excess generator power. This function assists the gas engine/generator sets with power flow during block loading and load shedding. Although the energy storage power can range by several MWs of discharge and charge power, the energy transferred is small (less than several kWhs per generator per event). Therefore, by using a small level of generator output power to make up for losses, the energy storage device 150 can be maintained close to 90% SOC. This permits almost the full capacity of the energy storage to be available when needed to support a power ride-through for interruption events.

The energy storage system 150, along with the associated components, can be enclosed within a single skid-mounted building. Automation and control is 100% redundant as to the PLC CPU, the UPS power supplies, and all critical control items necessary with energy storage and the associated control system. With proper training, the present system can be installed with a maximum downtime of less than 30 minutes.

The energy storage system 150 can be in the nature of chemical batteries, flywheels, or capacitors, or combinations of any of these devices. The energy storage system 150 must have sufficient electrical storage capacity and power rating to have adequate margins to meet the service life requirements and the power needs of the drilling rig. The energy storage system 150 is computer controlled. This controller is an electronic system which, through an array of sensors, collects data that is used to safely and reliably control charging and discharging of the energy storage system. The energy storage controller monitors health of the energy storage system through a number of parameters, such as voltage and current input/output, temperatures, state of charge, and others parameters.

The energy storage system of the present invention is designed to provide the proper amount of extra energy and power to yield the specific performance benefits for rig operation. The actual benefits of the energy storage system for natural gas drilling rigs have been determined through a careful evaluation of actual rig data. This was data extracted from a land-based drilling rig powered by natural gas engine generators and frequently sampled over four-month period of rig operation. The data includes both power generated and power consumed by the various rig functions.

The gas engine/generator sets have evolved from mechanically-controlled workhorses to an electronically-controlled, intelligent machine. They still require careful control for reliable operation. The parameters for the gas engine/generator sets, operating in an island mode, include kilowatt transducers to provide the generator's realtime, real power signal to the engine control system, sensors for monitoring the combustion conditions (oxygen level), cylinder-mounted detonation sensors, water jacket temperature sensors, air temperature sensors at inlets/outlets of the turbocharger turbines, and air manifold inlet temperatures. Each genset is controlled by this multi-parameter control and is more reliable than depending upon exhaust temperatures alone.

Energy storage reduces the criticality of governor-control of a gas engine/generator. Since the energy storage system permits the generator to operate well within its permissible minimum and maximum loading conditions, loading events are better controlled and less dynamic. Therefore, the energy storage system forces operation toward steady-state conditions enabling the reliability and responsiveness of the gas engine/generator to meet or exceed that of a dual fuel or diesel engine generator.

The energy storage system of the present invention is designed to provide the proper amount of amount of extra energy and power for the operation of the various loads. The energy storage system will assist the generator response with significantly enhanced block loading and load shedding capability with quicker recovery times. The present invention provides improved load management including reliable operation with just a single generator instead of two generators for most operations. The present invention provides better fuel economy and reduced emissions through less use of the resistive load banks and the auxiliary diesel generators. The present invention has better availability of generator power through improved step loading capability and UPS power ride-through for natural gas fuel interruptions. The energy storage system of the present invention assists the rig to operate from wellhead gas so as to further improve cost benefits. The energy storage's improvement to generator load response and UPS power ride-through for fuel interruptions reduces the vulnerability of generator output for variations and wellhead gas flow rate and methane content with the bi-directional electrical power provided by the energy storage system. The reliability and responsiveness of the gas engine generator sets meets or exceeds that of the dual fuel or diesel generators, while further providing fuel cost savings and reduced emissions. The present invention provides an anti-blackout aid with the UPS power ride-through for limited operation in the a reduced power mode and critical power mode. The generator can be operated at a somewhat higher load point so as to improved generator efficiency and extended engine life.

Figure 8:
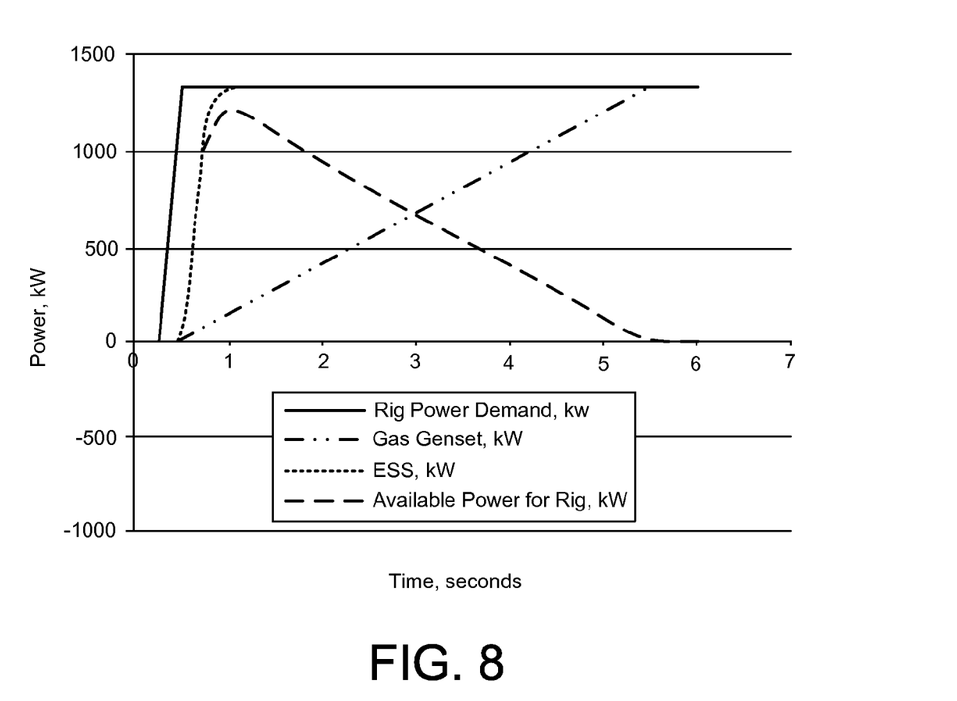
FIG. 8 is a graph showing the transient response for 0% to 100% block load.
Figure 9:
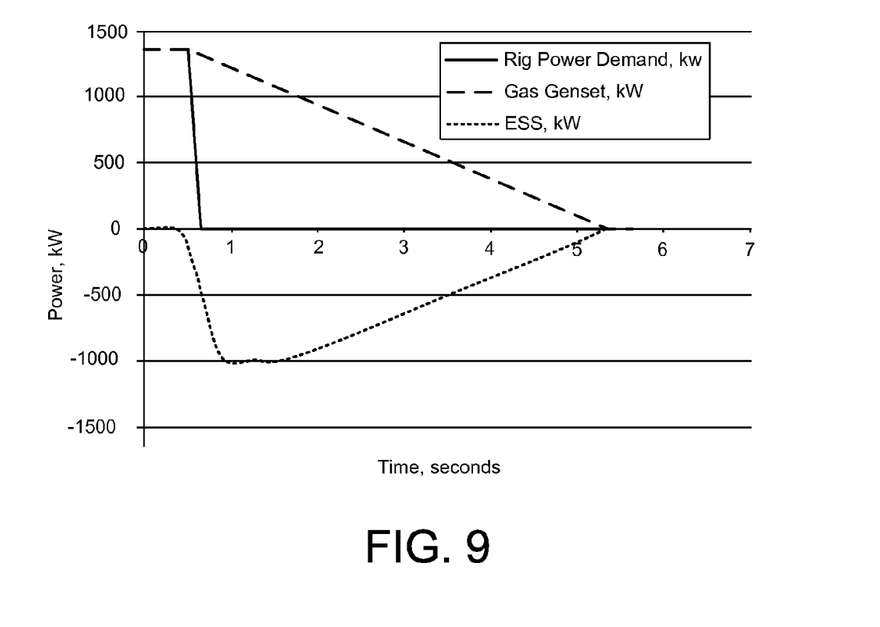
FIG. 9 is a graph showing transient response for 100% to 0% block load.

Referring to FIGS. 8 and 9, it can be seen that the present invention provides improved generator response for better block loading and load shedding. FIG. 8 shows the transient response for 0% to 100% block load. FIG. 9 shows transient response for 100% to 0% block load. The energy storage system is continually cycling between delivering power to meet rig demand and absorbing excess generator power. These functions assist the gas engine/generator sets with power flow during block loading and load shedding. With energy storage, the rig demand can be met with an apparent 100% block load response from any load point, including zero. As can be seen in FIG. 8, rig power demand of 1350 kW (the rated power of a single gas engine/generator) is nearly instantly supplied from the energy storage system 150. As the gas engine/generator sets ramps up in a controlled and reliable manner, the energy storage power is feathered back.

For power shedding, as shown in FIG. 9, 100% load shedding is now possible. In this case, the energy storage system is absorbing (recovering) the excess generator output, permitting the generator to shed its load in a controlled fashion well within allowed limits for reliable operations. The examples shown in FIGS. 8 and 9 are for the synchronized operation of a pair of gas engine/generators and the energy storage system 150. This facilitates a combined effective block load of 1.8 MW. This value is commensurate with the highest values typically observed during drilling in the measured rig data.

The present invention provides improved generator operation through better load management. Gas drilling rigs, without energy storage, will use a resistive load bank to elevate the loading point of the generators to a higher percent of full load. Although this also assists with block loading response, but less so than with energy storage, the penalty nevertheless is significant fuel consumption and increased emissions. The following Table I is indicative of a comparison of the generators time on based upon measured rig data (in hours).

TABLE I

|  | $1^{st}$ Generator | $2^{nd}$ Generator | $3^{rd}$ Generator |
| --- | --- | --- | --- |
| Rig without Energy Storage | 651 | 856 | 121 |

TABLE I-continued

|  | $1^{st}$ Generator | $2^{nd}$ Generator | $3^{rd}$ Generator |
| --- | --- | --- | --- |
| Rig with Energy Storage | 1097 | 105 | 0 |

From evaluation of the rig data, it was found that for drilling operations which consumed a significant portion of the power output of a single generator, then both generators were brought online but operated at much lower load points. This was done to ensure that a reserve margin of power is always available. The energy storage system of the present invention provides the reserve margin in an improved manner.

As can be seen in Table I, with energy storage, the rig loads can be managed more effectively. As can be seen in the "Rig without Energy Storage" row, the number of hours that each of the rig's gensets are "on" over the four months of data are shown. The next row shows the hours "on" for the gensets but with the energy storage system. As can be seen from the Table I, a single generator provides the primary power source. There is a minor additional of power that is provided from the a second generator. The second generator can be used for higher power events. The third generator was not at all during the monitored time.

Figure 7:
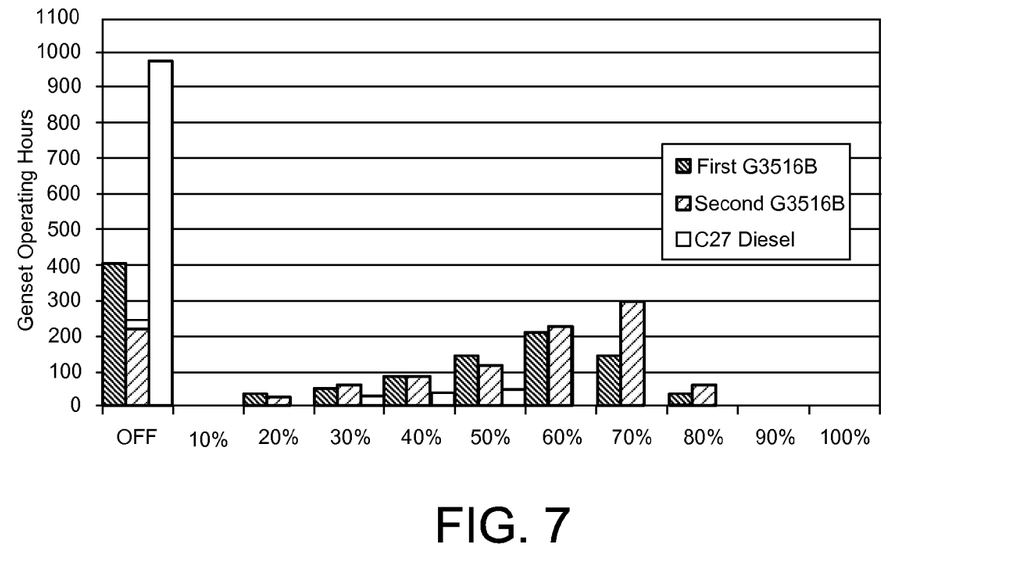
FIG. 7 is a graph showing the genset time at a percent load without the energy storage.
Figure 10:
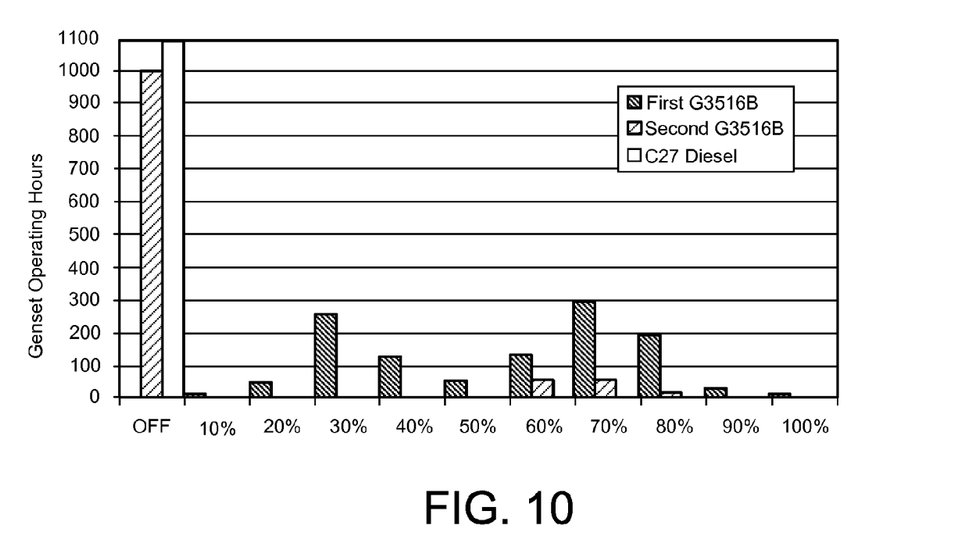
FIG. 10 is a graph showing the genset time as used with the energy storage system of the present invention.

A further example of improved management is shown in FIGS. 7 and 10 herein. The histogram shown in FIG. 7 shows a wide range of genset loading (without energy storage) mainly between 20% and 80%. The energy storage, as shown in the second histogram of FIG. 9, shows that the operating range for the first genset is somewhat improved. The second generator, while operating less, is operating at a much more efficient load point. The third auxiliary diesel genset is not required.

The present invention also provides for better fuel economy and reduced emissions. The following Table II shows the emissions from natural gas generators as compared to diesel generators.

TABLE II

|  | Nat Gas | Diesel |  |
| --- | --- | --- | --- |
| NOx | 0.670 | 8.740 | g/kWh |
| CO | 3.890 | 1.460 | g/kWh |
| THC | 9.110 | 0.230 | g/kWh |

Based upon four months of rig data, simulation results with energy storage showed over a 20% reduction in natural gas consumption and 100% reduction in the consumption of diesel. Natural gas consumption is improved primarily due to greatly reduced use of the resistive load bank and also due to more optimized generator operation. Diesel fuel use is eliminated since the diesel generator is not needed.

Also, over the duration of the four-month rig data and based upon the combined natural gas and diesel fuel reduction, emission reductions were calculated. NOx, and THC were reduced 46%, 24%, and 23%, respectively.

The energy storage system of the present invention constantly provides bi-directional power flow for improved generator operation through a DC/AC 300 inverter regulating current flow from the energy storage system to the DC bus. Power fluctuations of less must less than one second can take some rig components offline so as to require an extended recovery time. In the event of power generator interruptions, the energy storage system 150 is online to provide UPS-like, power ride-through to maintain power quality. AC bus voltage will be stabilized for these power interruptions lasting up to several seconds and up to peak powers of several MWs or more. For example, one benefit of this feature is to always maintain power to LNG skid to prevent fuel interruptions, if so equipped. Additionally, the power ride-through, when using wellhead gas as generator fuel, reduces the vulnerability of generator output to variations in wellhead gas flow rate and methane content.

For longer duration events with complete generator failure, limited operation can be sustained. In this "Reduced Power" mode, the energy storage system continues to supply power to specific components such as rig computer controls, natural gas fuel supply, mud and mixing pumps, rig hotel loads (including lighting), radiator fans, mud pump blowers, air conditioning, and air compressors. If the generator failure persists, a more limited scenario, referred to as "Critical Power" operation, provides a lower level of power to preserve critical functions to avoid rig blackout. Critical Power operation may include rig computer controls, natural gas fuel supply, rig hotel loads, specific radiator fans, air conditioning, and air compressors.

Figure 11:
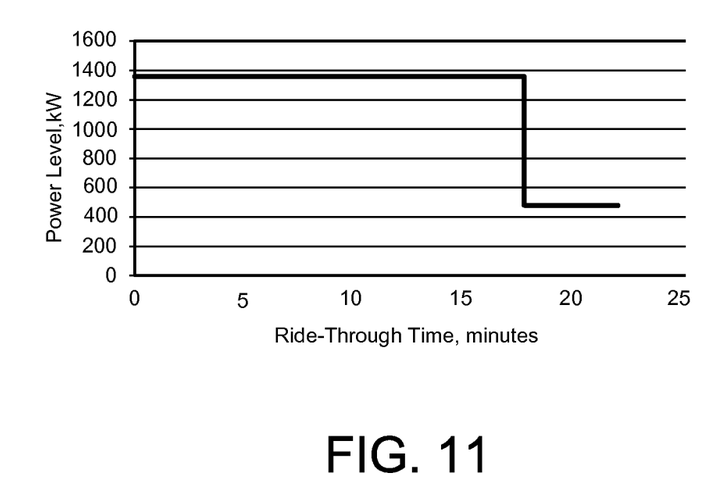
FIG. 11 is a graph showing the ride-through power as provided by the energy storage system of the present invention.
Figure 12:
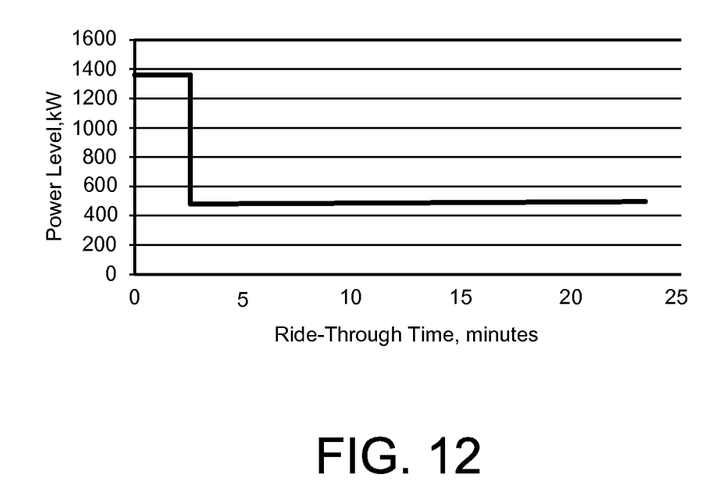
FIG. 12 is a graph showing an alternative availability of ride-through power with the energy storage system of the present invention.

FIG. 11 shows the "Reduced Power" mode. The rig goes to a reduced power mode for 18 minutes so as to allow limited operation for those selective components. In 5 minutes, the "Critical Power" mode is available. FIG. 12 shows that the rig goes to a "Reduce Power" mode for 5 minutes so as to allow for limited operation of those selected components. Then, for 40 minutes, the "Critical Power" mode is available to bring the generators back online and to reestablish rig power. As such, the system of the present invention can provide such ride-through power for each of these events.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A system for the supply of power to a drilling rig, the system comprising:
    a natural gas engine/generator having an output line so as to supply AC power;
    an energy storage system; and
    a load switchably connected to said natural gas engine/generator and said energy storage system, said natural gas engine/generator and said energy storage system having a capacity suitable for supplying requisite power to said load, a rectifying means connected to said output line of said natural gas engine/generator, said rectifying means for converting the AC power to DC power, said rectifying means being a silicon-controlled rectifier, said silicon-controlled rectifier being phase-controlled so as to be responsive to a power requirement of said load.

2. The system of claim 1, further comprising:
    a natural gas supply cooperative with said natural gas engine/generator so as to supply natural gas to said natural gas engine/generator.

3. The system of claim 2, said natural gas supply being a wellhead gas.

4. The system of claim 1, said load being at least one component of the drilling rig.

5. The system of claim 1, said energy storage system being a battery.

6. A system for the supply of power to a drilling rig, the system comprising:
    a natural gas engine/generator having an output line so as to supply AC power;
    an energy storage system;
    a load switchably connected to said natural gas engine/generator and said energy storage system, said natural gas engine/generator and said energy storage system having a capacity suitable for supplying requisite power to said load; and
    a phase microcontroller connected to said load and to said natural gas engine/generator, said phase microcontroller cooperative with said energy storage system so as to supply power from said energy storage system to said load individually or in combination with said natural gas engine/generator.

7. A system for the supply of power to a drilling rig, the system comprising:
    a natural gas engine/generator having an output line so as to supply AC power;
    an energy storage system;
    a load switchably connected to said natural gas engine/generator and said energy storage system, said natural gas engine/generator and said energy storage system having a capacity suitable for supplying requisite power to said load, said natural gas engine/generator comprising a plurality of natural gas engine/generators having the output lines thereof connected to a common AC bus, said load comprising a plurality of loads connected by a line to a common DC bus, said energy storage system connected to said common DC bus;
    a rectifying means connected between said common AC bus and said common DC bus so as to cause said plurality of natural gas engine/generators to pass DC power to said common DC bus; and
    a plurality of autotransformers respectively connected between said plurality of natural gas engine/generators and said common AC bus.

8. A system for the supply of power to a drilling rig, the system comprising:
    a natural gas engine/generator having an output line so as to supply AC power;
    an energy storage system;
    a load switchably connected to said natural gas engine/generator and said energy storage system, said natural gas engine/generator and said energy storage system having a capacity suitable for supplying requisite power to said load; and
    a switching means for switching a supply of power to said load between said natural gas engine/generator and said energy storage system based on a power output of said natural gas engine/generator and based upon the requisite power required by said load.

9. The system of claim 8, said switching means for monitoring the output of said natural gas engine/generator.

10. A method for the supply of power to a drilling rig, the method comprising:
    producing power from an natural gas engine/generator so as to produce an AC power output;
    providing an energy storage system switchably connected to a load; and
    switching power supplied to the load between one or both of said natural gas engine/generators and said energy storage system based upon a power requirement of the load.

11. The method of claim 10, said further comprising:
    rectifying the AC power output from said natural gas engine/generator so as to pass DC power to the load.

12. The method of claim 11, the step of switching comprising:

switching the rectified power by a phase-controlled microcontroller.

13. The method of claim 10, further comprising:

switching power from said natural gas engine/generator to said energy storage system when the power output of the natural gas engine/generator exceeds the power requirement of the load.

14. The method of claim 10, further comprising:

delivering a supply of natural gas from a wellhead adjacent said natural gas engine/generator to the natural gas engine/generator.

15. The method of claim 10, further comprising:

autotransforming the AC power output from said natural gas engine/generator; and rectifying the autotransformed AC power from said natural gas engine/generator so as to pass DC power to the load.

\* \* \* \* \*